United States Patent
Crocker

(10) Patent No.: US 10,265,648 B2
(45) Date of Patent: *Apr. 23, 2019

(54) WATER AND DEBRIS RECOVERY SYSTEM

(71) Applicant: Waterblasting, LLC, Stuart, FL (US)

(72) Inventor: James P. Crocker, Stuart, FL (US)

(73) Assignee: Waterblasting, LLC, Stuart, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,266

(22) Filed: Mar. 5, 2018

(65) Prior Publication Data

US 2018/0193777 A1 Jul. 12, 2018

Related U.S. Application Data

(63) Continuation of application No. 14/696,188, filed on Apr. 24, 2015, now Pat. No. 9,908,068, which is a continuation-in-part of application No. 13/767,442, filed on Feb. 14, 2013, now abandoned.

(60) Provisional application No. 61/984,540, filed on Apr. 25, 2014, provisional application No. 61/598,763, filed on Feb. 14, 2012.

(51) Int. Cl.
| | | |
|---|---|---|
| *B01D 29/11* | (2006.01) | |
| *B01D 21/26* | (2006.01) | |
| *B08B 3/02* | (2006.01) | |
| *B08B 3/14* | (2006.01) | |

(52) U.S. Cl.
CPC .......... *B01D 29/117* (2013.01); *B01D 21/267* (2013.01); *B08B 3/02* (2013.01); *B08B 3/14* (2013.01); *B08B 2203/0229* (2013.01)

(58) Field of Classification Search
None
See application file for complete search history.

(56) References Cited

U.S. PATENT DOCUMENTS

| | | |
|---|---|---|
| 2,074,623 A | 3/1937 | Schroth |
| 2,444,586 A | 7/1948 | Erb |
| 2,926,835 A | 3/1960 | Lorenz |
| 3,043,200 A | 7/1962 | Huttash |

(Continued)

OTHER PUBLICATIONS

Specialty Chemicals/Coagulants & Flocculants, Ecologix Environmental Systems, Internet article: http://www.dcologixsystems.com/ch_coag_floc.php, (Retrieved Jan. 21, 2009).

(Continued)

*Primary Examiner* — Jason Y Ko
*Assistant Examiner* — Cristi J Tate-Sims
(74) *Attorney, Agent, or Firm* — McHale & Slavin, P.A.

(57) ABSTRACT

The present system relates to a water and debris recovery system for a water blasting device suitable for mounting upon the frame of a mobile vehicle for easy transport and use. The system includes a liquid reservoir connected to a high pressure fluid pump for directing ultra-high pressure water through a blast head to remove the coatings or markings from a surface. The blast head includes a shroud which surrounds the blasting area to at least partially contain the water and debris dislodged from the surface. A vacuum pump is secured to the shroud with the vacuum passing through a cyclone type separator, allowing the water and debris to settle to the bottom portion of the cyclone. The tank includes a floating floor and bladder assembly that allows the same space to be utilized for clean as well as dirty water while maintaining separation of the two.

14 Claims, 14 Drawing Sheets

(56) References Cited

U.S. PATENT DOCUMENTS

| | | |
|---|---|---|
| 3,060,484 A | 10/1962 | Krammes |
| 3,151,348 A | 10/1964 | Maasberg |
| 3,166,773 A | 1/1965 | Wyczalek |
| 3,303,895 A | 2/1967 | Fontenot |
| 3,407,005 A | 10/1968 | Simms et al. |
| 3,489,679 A | 1/1970 | Davidson et al. |
| 3,532,070 A | 10/1970 | Lamarque |
| 3,540,073 A | 11/1970 | Issenmann et al. |
| 3,619,632 A | 11/1971 | Labombarde |
| 3,639,936 A | 2/1972 | Ashton |
| 3,658,589 A | 4/1972 | Shaddock |
| 3,667,487 A | 6/1972 | Schoenbeck et al. |
| 3,694,033 A | 9/1972 | Rowley et al. |
| 3,701,426 A | 10/1972 | Wetzel |
| 3,753,777 A | 8/1973 | Thomsen et al. |
| 3,787,916 A | 1/1974 | Akagi et al. |
| 3,812,379 A | 5/1974 | Kaufman et al. |
| 3,900,969 A | 8/1975 | Diehn |
| 3,929,377 A | 12/1975 | Weaver et al. |
| 3,959,010 A | 5/1976 | Thompson et al. |
| 3,977,128 A | 8/1976 | Goff |
| 4,007,026 A | 2/1977 | Groh |
| 4,158,248 A | 6/1979 | Palmer |
| 4,158,575 A | 6/1979 | Townsend |
| 4,199,837 A | 4/1980 | Fisco, Jr. |
| 4,227,893 A | 10/1980 | Shaddock |
| 4,241,803 A | 12/1980 | Lauber |
| 4,290,820 A | 9/1981 | Swisher, Jr. et al. |
| 4,336,671 A | 6/1982 | Nelson |
| 4,376,358 A | 3/1983 | Shelton |
| 4,377,924 A | 3/1983 | Bergh |
| 4,509,963 A | 4/1985 | Jackson |
| 4,530,131 A | 7/1985 | Zell et al. |
| 4,578,840 A | 4/1986 | Pausch |
| 4,683,684 A | 8/1987 | Yie |
| 4,753,052 A | 6/1988 | Dickson |
| 4,793,734 A | 12/1988 | Shook et al. |
| 4,801,376 A | 1/1989 | Kulitz |
| 4,806,172 A | 2/1989 | Adaci et al. |
| 4,819,676 A | 4/1989 | Blehert et al. |
| 4,839,061 A | 6/1989 | Manchak, Jr. et al. |
| 4,854,770 A | 8/1989 | Puchala et al. |
| 4,935,984 A | 6/1990 | Bryant et al. |
| 5,002,595 A | 3/1991 | Kehr |
| 5,022,809 A | 6/1991 | Hinson |
| 5,041,165 A | 8/1991 | Urbani |
| 5,060,334 A | 10/1991 | Strauser et al. |
| 5,076,919 A | 12/1991 | Francisco, Jr. |
| 5,078,161 A | 1/1992 | Raghavan et al. |
| 5,082,065 A | 1/1992 | Fletcher |
| 5,108,471 A | 4/1992 | Poborsky |
| 5,224,236 A | 7/1993 | Sallquist |
| 5,236,278 A | 8/1993 | Dickson |
| 5,589,080 A | 12/1996 | Cho et al. |
| 5,600,995 A | 2/1997 | Sherman |
| 5,605,381 A | 2/1997 | Schmoock, Jr. et al. |
| H1660 H | 7/1997 | Herman et al. |
| 5,704,989 A | 1/1998 | Page |
| 5,708,989 A | 1/1998 | Ellis |
| 5,709,242 A | 1/1998 | Bergen |
| 5,772,497 A | 6/1998 | Dummermuth |
| 5,826,460 A | 10/1998 | Soncina et al. |
| 5,965,020 A | 10/1999 | Pierson |
| 5,979,012 A | 11/1999 | Fritz |
| 6,042,656 A | 3/2000 | Anderson |
| 6,042,726 A | 3/2000 | Anderson |
| 6,073,720 A | 6/2000 | Vanderlinden |
| 6,082,630 A | 7/2000 | Bohrer |
| 6,113,800 A | 9/2000 | Hopkins et al. |
| 6,129,094 A | 10/2000 | Moll et al. |
| 6,152,674 A | 11/2000 | Ogrodnick |
| 6,224,317 B1 | 5/2001 | Kann et al. |
| 6,258,268 B1 | 7/2001 | Lake |
| 6,302,967 B1 | 10/2001 | Rohrbacher et al. |
| 6,358,406 B1 | 3/2002 | Hirs |
| 6,393,944 B1 | 5/2002 | Soncina et al. |
| 6,394,033 B1 | 5/2002 | Trogstam et al. |
| 6,402,822 B1 | 6/2002 | Najm |
| 6,495,031 B1 | 12/2002 | Bratten |
| 6,653,265 B2 | 11/2003 | Rossi et al. |
| 6,835,315 B2 | 12/2004 | Fox et al. |
| 6,896,742 B2 | 5/2005 | Geyer et al. |
| 7,029,579 B2 | 4/2006 | Tapp |
| 7,204,365 B2 | 4/2007 | Bahymer et al. |
| 7,216,397 B1 | 5/2007 | Tanner |
| 7,240,681 B2 | 7/2007 | Salk |
| 7,255,116 B2 | 8/2007 | Crocker |
| 7,290,307 B1 | 11/2007 | Chao |
| 7,325,588 B2 | 2/2008 | Malone et al. |
| 7,798,158 B2 | 9/2010 | Crocker |
| 2002/0178529 A1 | 12/2002 | Geyer et al. |
| 2003/0205242 A1 | 11/2003 | Gerber et al. |
| 2004/0070172 A1 | 4/2004 | Colistro |
| 2004/0237247 A1 | 12/2004 | Nowak et al. |
| 2005/0268949 A1 | 12/2005 | Rosa |
| 2006/0000491 A1 | 1/2006 | Crocker |
| 2006/0185689 A1 | 8/2006 | Crocker |
| 2007/0169797 A1 | 6/2007 | Crocker |
| 2007/0204889 A1 | 9/2007 | Crocker |
| 2007/0207711 A1 | 9/2007 | Crocker |
| 2008/0066781 A1 | 3/2008 | Crocker |
| 2009/0241999 A1 | 10/2009 | Crocker |
| 2009/0242003 A1 | 10/2009 | Crocker |
| 2010/0192980 A1 | 8/2010 | Turner |
| 2011/0192771 A1 | 8/2011 | Mori et al. |

OTHER PUBLICATIONS

Potable and Process Water Chemical Applications, Internet article: http://www.coynechemical.com/environmental_app.php, 2000 George S. Coyne Chemical Co., Inc., (Retrieved Jan. 21, 2009).

Johnson, B. et al, Committee report: Characterization of inorganic coagulant/polymer blends using refractive index and specific gravity measurements, Cat.INIST, 2004, vol. 96, pp. 170-173, American Water Works Association, Denver, CO, Internet article: http://cat.inist.fr/?aModele=afficheN&cpsidt=15694785, (Retrieved Jan. 21, 2009).

WATER AND DEBRIS RECOVERY SYSTEM

RELATED APPLICATIONS

In accordance with 37 C.F.R 1.76, a claim of priority is included in an Application Data Sheet filed concurrently herewith. Accordingly, the present invention claims priority as a Continuation of U.S. patent application Ser. No. 14/696,188, entitled "WATER AND DEBRIS RECOVERY SYSTEM", filed Apr. 24, 2015, which claims priority to U.S. Provisional Patent Application No. 61/984,540, entitled "WATER AND DEBRIS RECOVERY SYSTEM", filed Apr. 25, 2014, and claims priority as a Continuation-in-Part of U.S. patent application Ser. No. 13/767,442, entitled "WATER AND DEBRIS RECOVERY SYSTEM", filed on Feb. 14, 2013, which claims priority to U.S. Provisional Application 61/598,763, entitled "WATER AND DEBRIS RECOVERY SYSTEM", filed on Feb. 14, 2012. The contents of each of the above referenced applications are herein incorporated by reference in its entirety.

FIELD OF THE INVENTION

This invention relates to the field of high pressure water cleaning devices for highways, airport runways, parking decks, subway stations, ships and other hard surfaces.

BACKGROUND OF THE INVENTION

Surface cleaning apparatus, such as pressure washers, are useful for cleaning a variety of objects. Such devices require a clean supply of water for proper operation, hut create wastewater by entraining solids from the cleaned surface into the used source water. Although there are many types of pressure washing systems, a typical system utilizes an engine that powers a pump. The inlet side of the pump is connected to a low pressure water source such as a tank or a municipal water supply, while the high pressure side of the pump is connected to a high pressure hose and wand for controlling the flow of high pressure water generated by the pump. The high pressure water is directed at a surface to dislodge dirt, paint and the like, and the water is generally allowed to drain into the storm sewer.

Ultra-high pressure washers, supplying more than 25,000 P.S.I. are also known. These systems include a large engine, typically diesel, which operates a large multi-cylinder pump to generate high volumes of water at ultra-high pressures. The ultra-high pressure water is directed through piping and/or hoses to various types of blast heads suitable for controlling the flow and direction of the ultra-high pressure water. One particular use for ultra-high pressure water devices is the removal of stripes or other markings from road surfaces. When polymers such as paint or plastic are used for roadway marking, the surface of the pavement s penetrated from ⅛-⅜ inch; whereby water blasting is the only known method of removing the stripe material from below the surface without removing a portion of the roadway surface. Ultra-high pressure water washers are also utilized for removing paint from ships, cleaning industrial facilities, removing graffiti, removing rubber from aircraft runways and demolition.

One problem associated with both low and ultra-high pressure water cleaning equipment is maintaining an adequate supply of clean water for continuous operation of the system. Dirty or contaminated water causes numerous problems with water cleaning equipment such as excessive pump wear, clogged filters, nozzles, screens and the like.

Because cleaning often needs to take place away from municipal water supplies, water is often transported to the cleaning site. Because the water cleaning equipment requires large volumes of water to be effective, additional equipment is needed to haul in tanks of water. Alternatively, cleaning must be stopped so that additional water may be obtained.

The problem of hauling sufficient water to a job site with the truck is exacerbated by the vacuum tanks used to recover the water and debris. The vacuum tanks are large, and therefore must be made incredibly strong to stand up to the vacuum pressure applied over the large internal surface area. The required strength adds significant weight to the assembly, and thus to the vehicle carrying the tank, reducing the amount of clean water than can be carried by the same vehicle for blasting the surface.

Therefore, what is needed in the art is a system for recovering water and debris from a waterblasting or water demolition project that does not require a vacuum tank to retain all of the water and debris collected from the blast head. The system should utilize vacuum for recovery of the water and debris, which can then be pumped to an open top tank for dewatering or disposal. The debris tank should double as a fresh water tank whereby the clean and dirty water are maintained separately. The tank should also be equipped with a filter bag for dewatering the debris from the dirty water for improved disposal of the waste. The recovery system should be compact for mounting on various types of vehicles, trailer and skids.

SUMMARY OF THE INVENTION

Briefly, disclosed is a water and debris recovery system for a water blasting device, water demolition system, vacuum truck or the like; the system being suitable for mounting upon the frame of a mobile vehicle for easy transport and use. The system includes a liquid reservoir connected to a high pressure fluid pump for directing ultra-high pressure water through a blast head to remove the coatings or markings from a surface. The blast head is mounted on a vehicle and includes a shroud which surrounds the blasting area to at least partially contain the water and debris dislodged from the surface. A vacuum pump is secured to the shroud, with the vacuum passing through a cyclone type separator, allowing the water and debris to settle to the bottom portion of the cyclone while the air is allowed to vent to the atmosphere. A unique debris pump containing a rotary valve is then utilized to transfer the collected water and debris into an open top tank or other tank not containing vacuum for transport or dewatering. The water tank doubles as a debris tank to conserve space and reduce weight of the vehicle while also providing increased run time for the device.

Accordingly, it is an objective of the present invention to provide a water and debris recovery system which can be readily transported.

It is a further objective of the present invention to provide a water and debris recovery system that does not need a vacuum tank for the recovery and storage of the recovered water and debris.

It is yet another objective of the present invention to provide a unique debris pump suitable for transferring water and debris from a vacuum separator to a non-vacuum debris tank.

It is still another objective of the present invention to provide a debris pump suitable for transfer of sticky polymeric materials.

It is still yet another objective of the present invention to provide a non-vacuum debris tank that contains fresh and dirty water.

It is still yet a further objective of the present invention to provide a debris tank that includes a bladder for the containment of a first type of water while a second type of water is contained around the bladder in the same tank.

Still yet another objective of the present invention is to provide a debris tank with a floating floor supported by a bladder filled with a first type of water.

Yet another objective of the present invention is to provide a debris tank that contains two types of separated water wherein one type of the water may be dumped by tilting the debris tank without dumping the second type of water.

Still yet another objective of the present invention is to provide a debris tank that contain clean water and dirty water and dewatered sludge.

An even further objective of the present invention is to provide a debris tank that includes a bladder for clean water and a filter bag for dewatering a dirty which is also stored in the same tank as the bladder.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
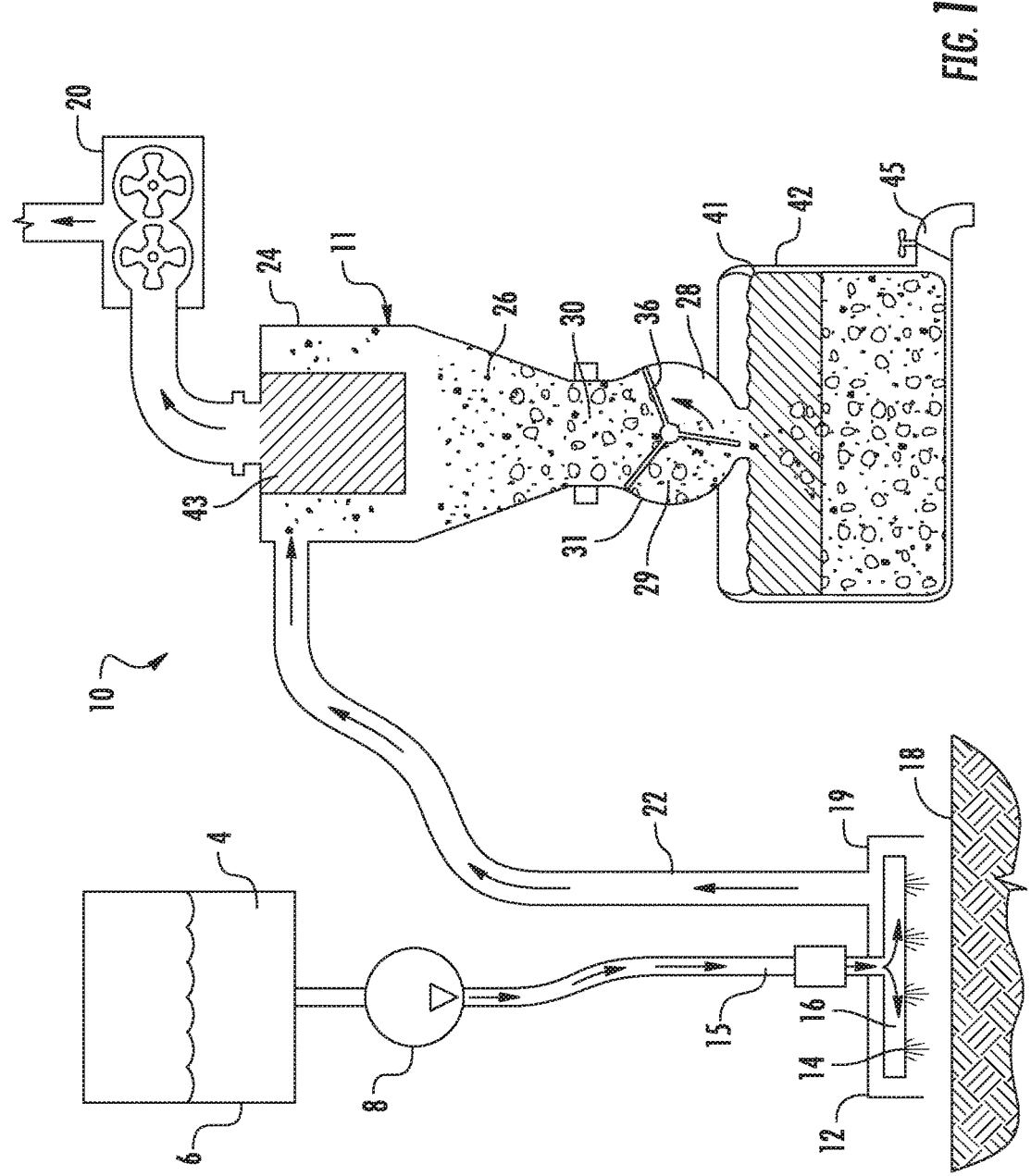
FIG. 1 is a schematic representation of the water and debris recovery system of the present invention, illustrated with a rotary valve type pump.
Figure 2:
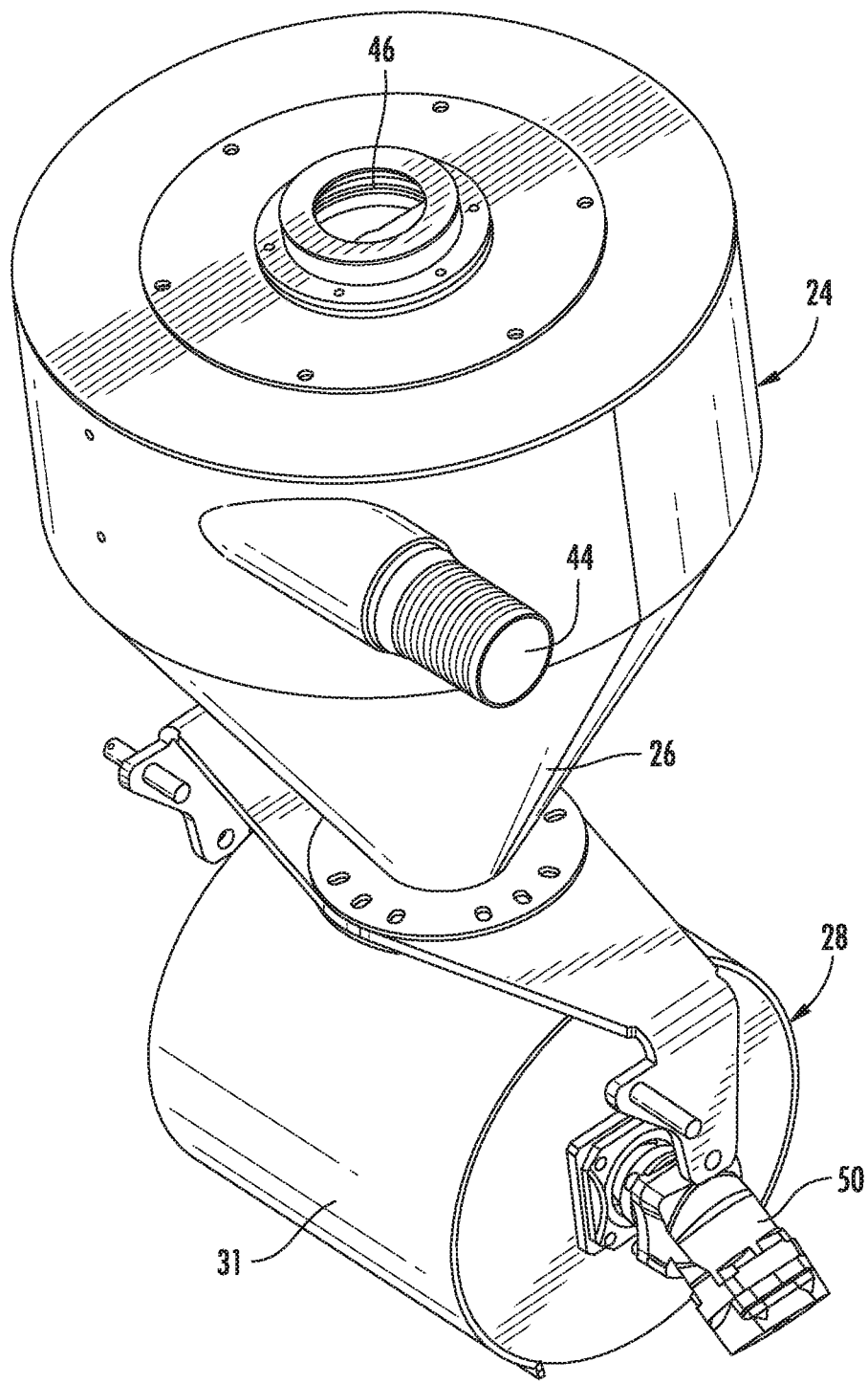
FIG. 2 is a top perspective view of one embodiment of the debris pump and vacuum separator of the present invention.
Figure 3:
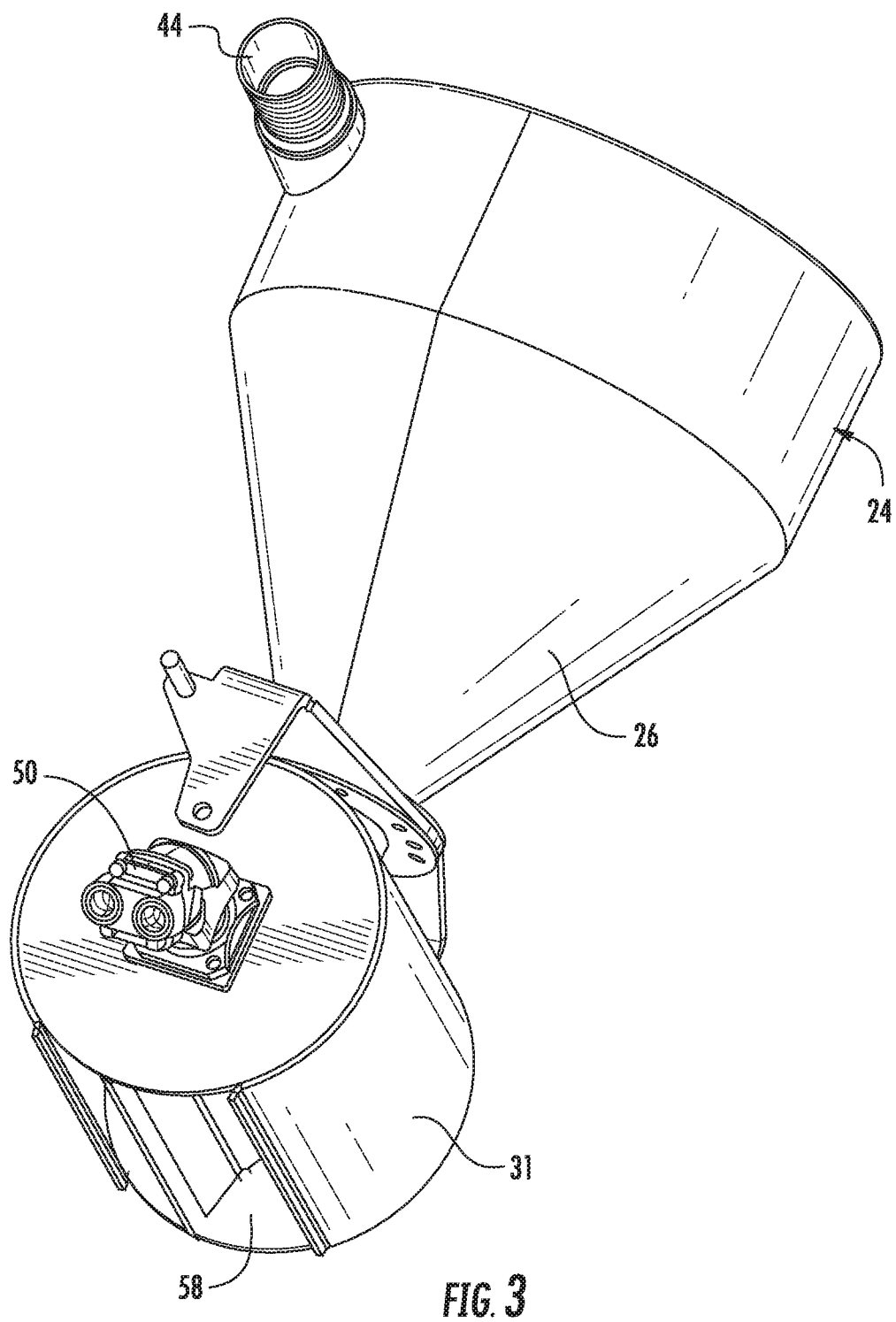
FIG. 3 is a bottom perspective view of one embodiment of the debris pump and vacuum separator of the present invention.
Figure 4:
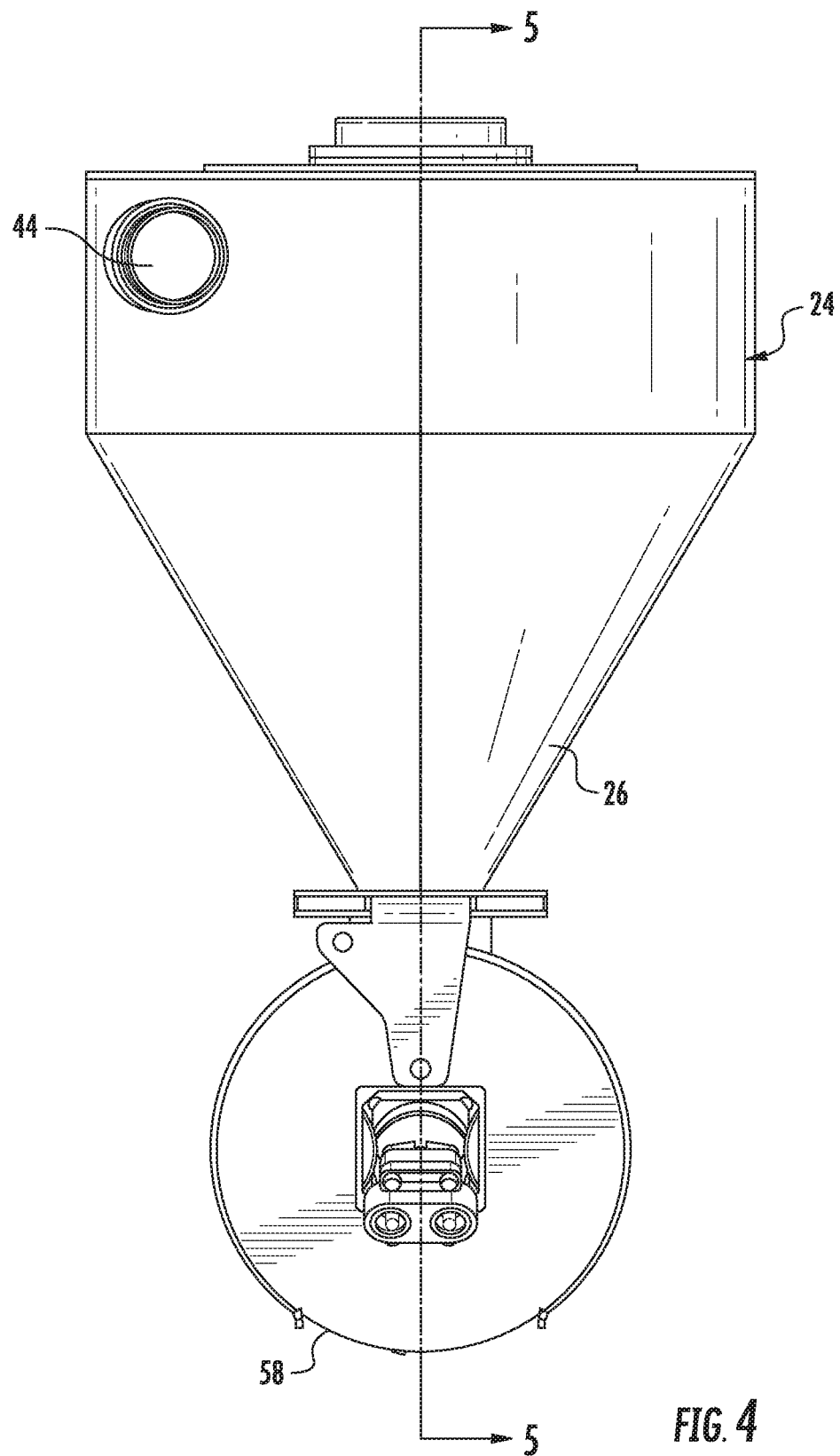
FIG. 4 is an end view of one embodiment of the debris pump and vacuum separator of the present invention.
Figure 5:
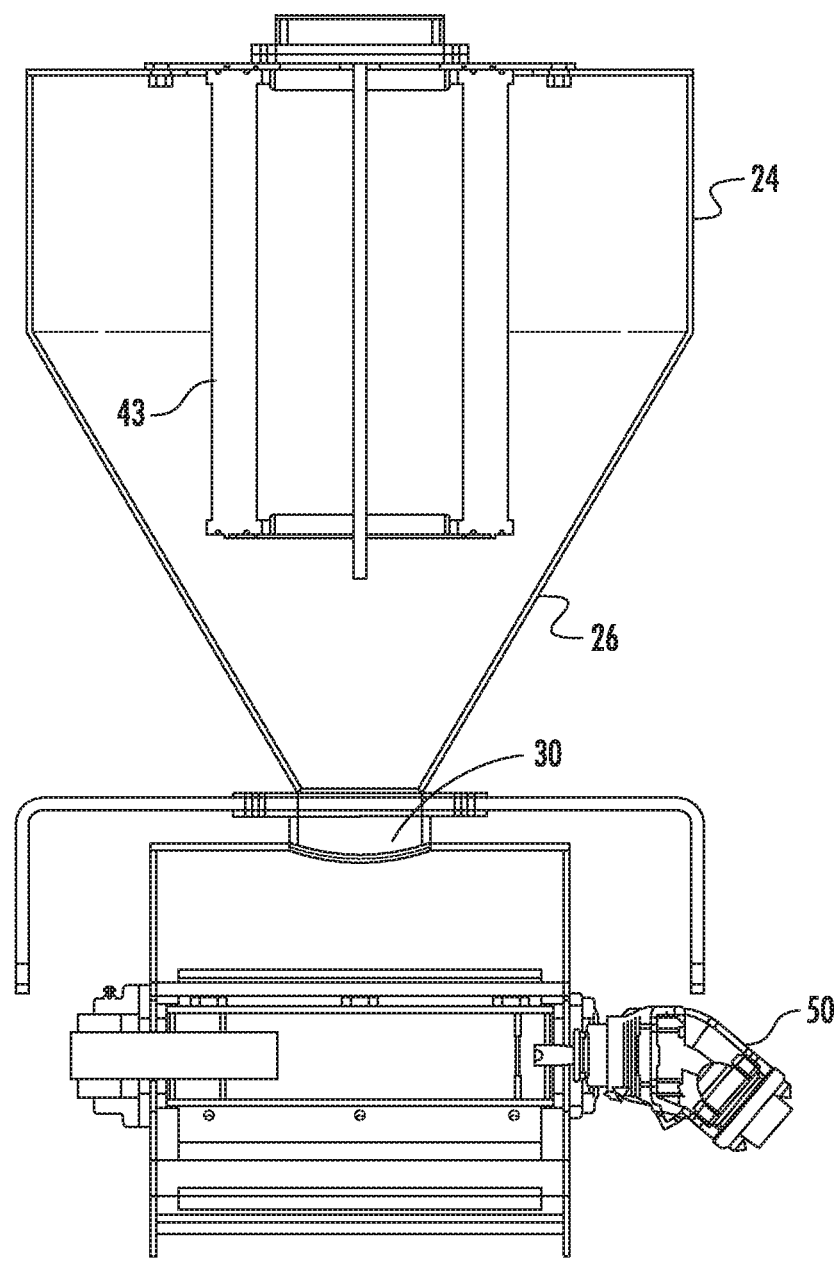
FIG. 5 is a section view taken along lines 5-5 of FIG. 4.
Figure 6:
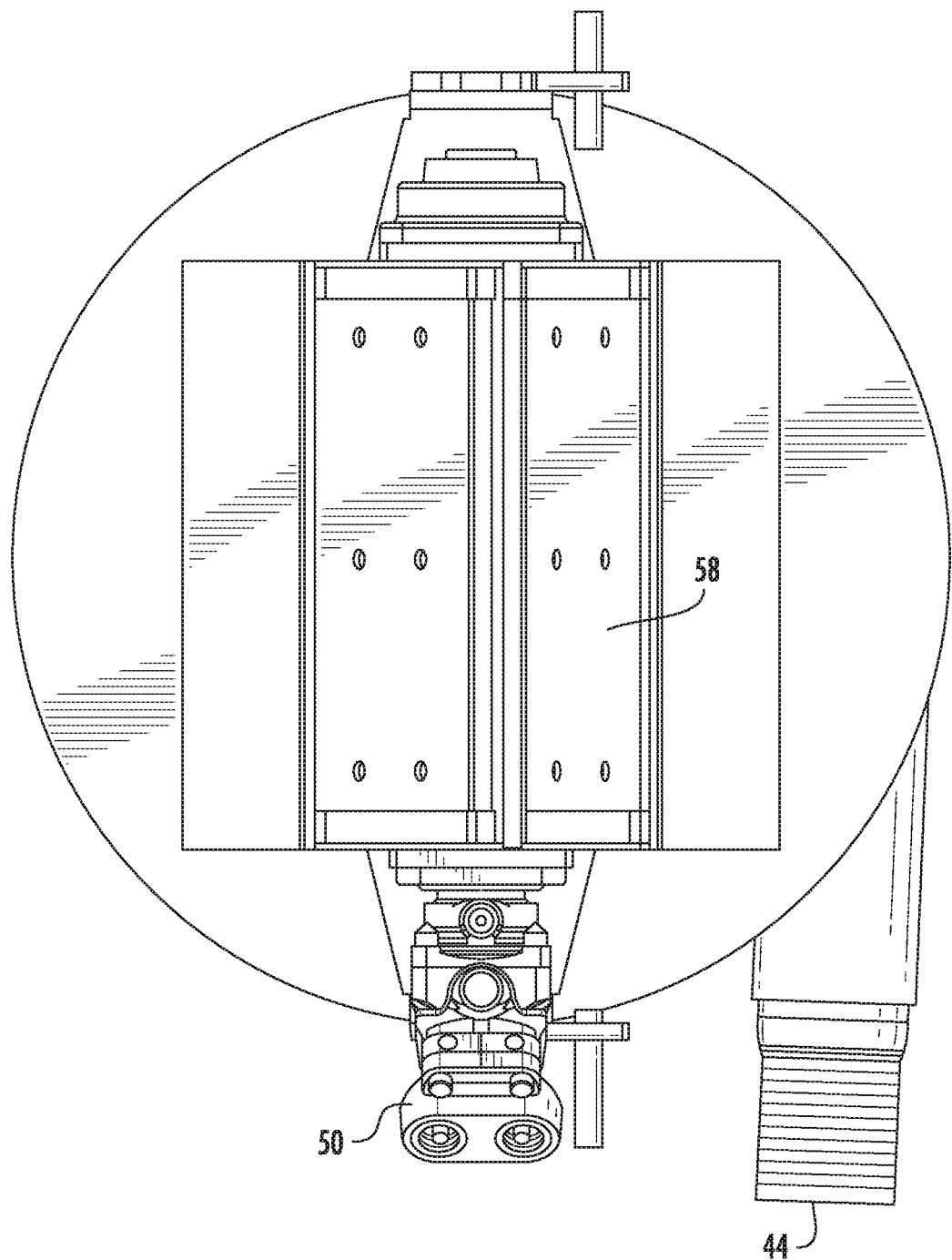
FIG. 6 is a bottom view of one embodiment of the debris pump and vacuum separator of the present invention.
Figure 7:
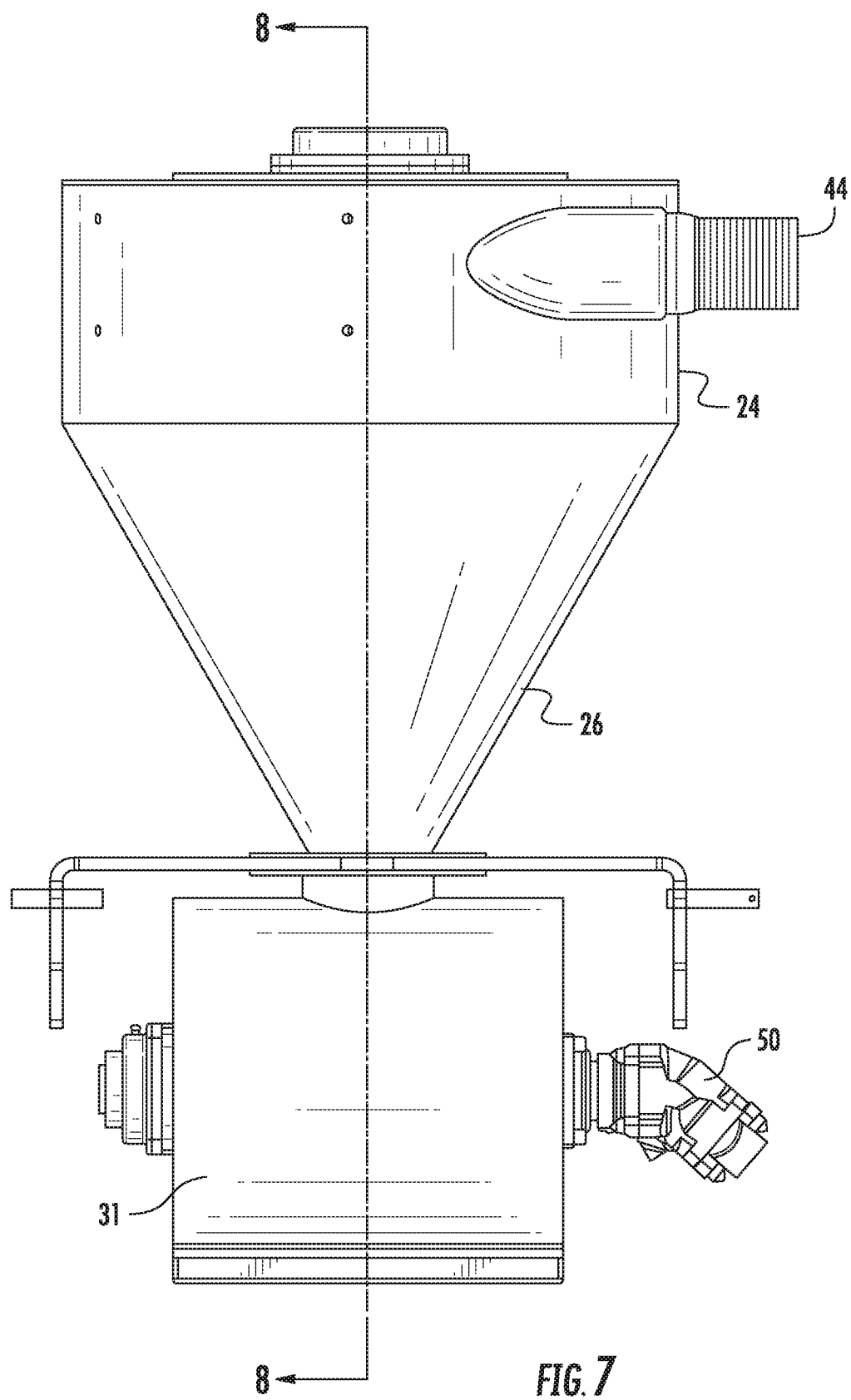
FIG. 7 is a side view of one embodiment of the debris pump and vacuum separator of the present invention.
Figure 8:
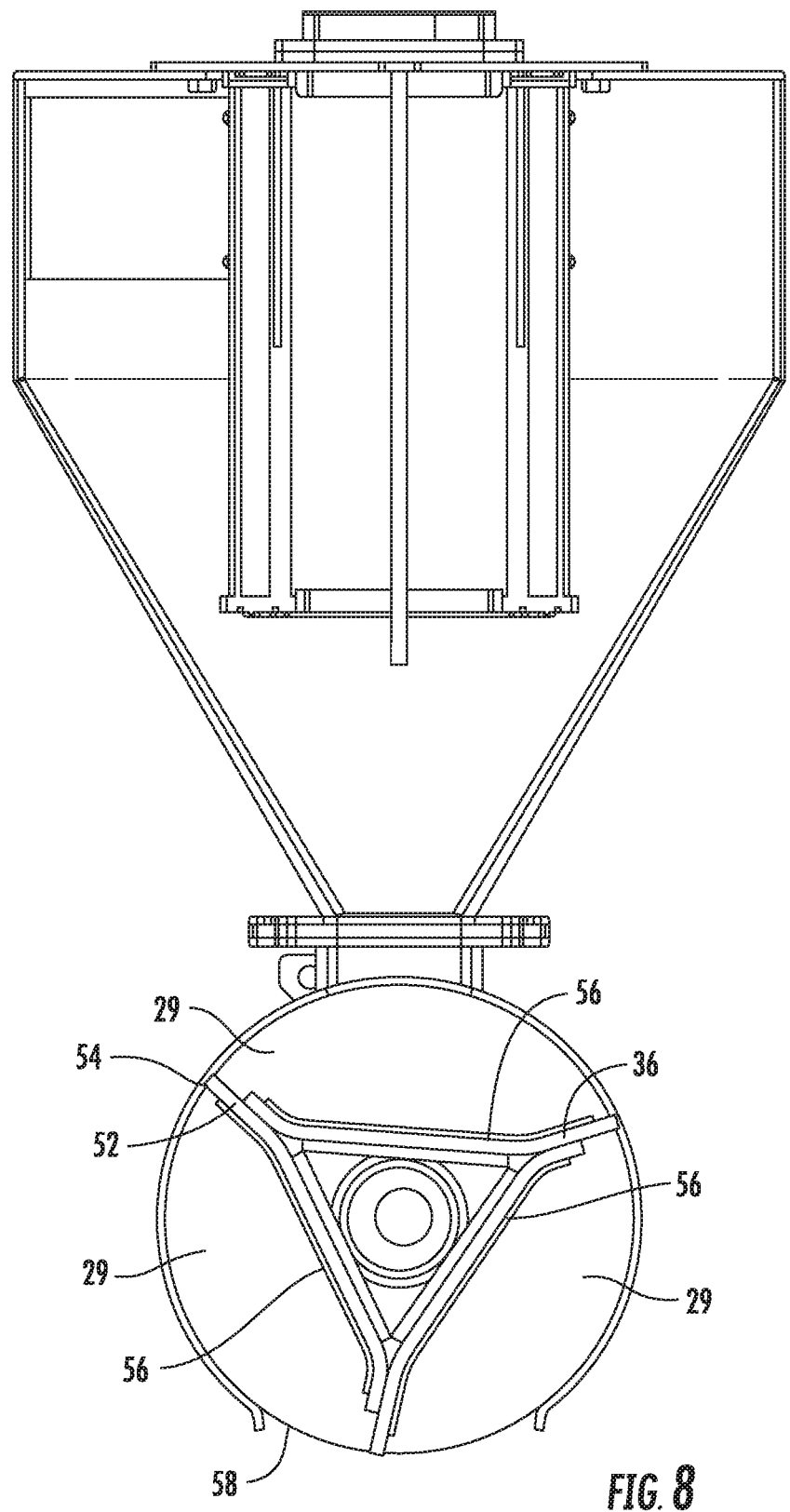
FIG. 8 is a section view taken along lines 8-8 of FIG. 7.
Figure 9:
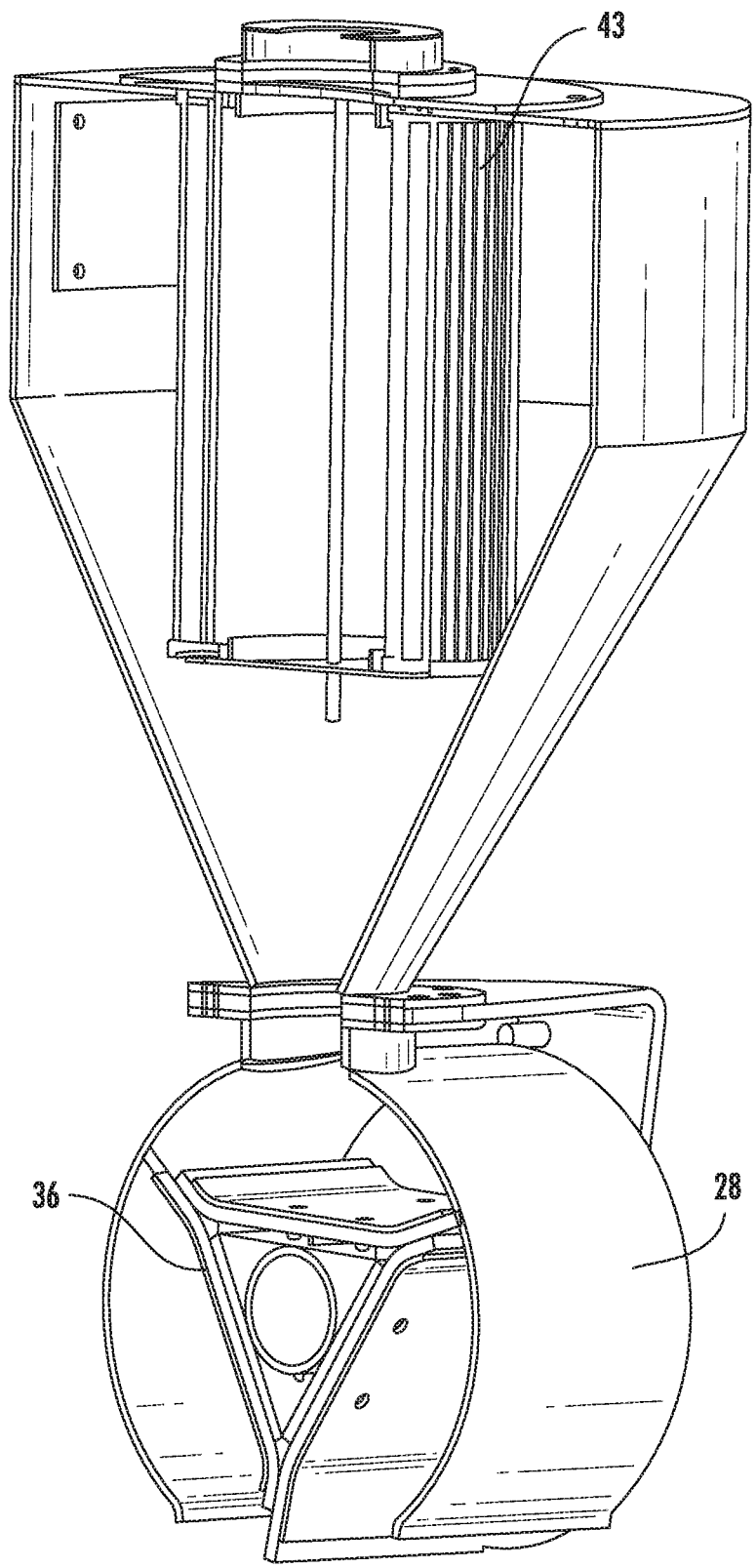
FIG. 9 is a perspective view taken along lines 8-8 of FIG. 7.
Figure 10:
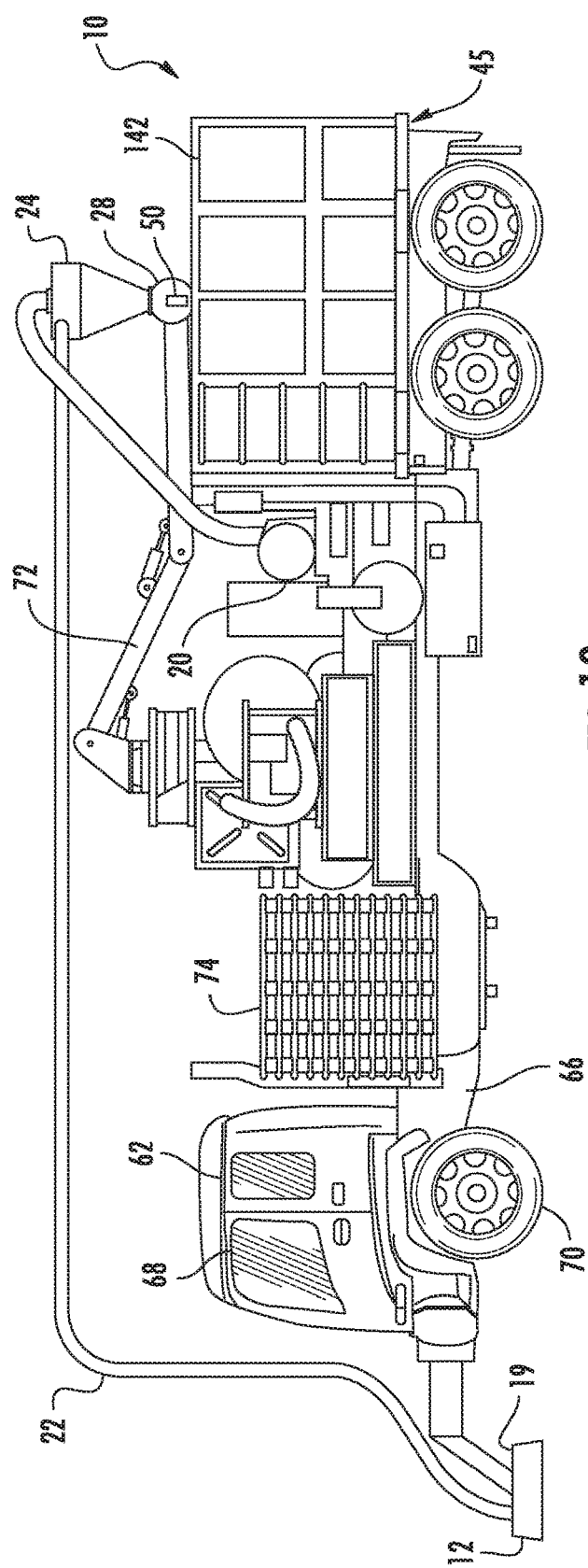
FIG. 10 is a side view of one embodiment of the present invention illustrated in use on a road marking removal truck.

Referring to FIG. 1, one embodiment of the water and debris recovery system 10 is illustrated. The system begins at the blast head 12 where fresh water 4 from debris tank 6 is directed through ultra-high pressure pump 8 to create high pressure water 15 which is directed through nozzles 14 secured to rotationally mounted spray bar 16. The high pressure water 15 impinges on the surface 18, removing surface markings as well as any loose debris which is trapped within the shroud 19. Vacuum pump 20 provides a negative air flow through the shroud 19 to draw the water and debris into tube 22. The vacuum pump 20 is preferably a roots type blower, however, any pump or fan suitable for creating sufficient vacuum, e.g. negative air pressure, to transfer the water and debris is suitable. It should be noted that vacuum may be developed by the rotating spray bar 16 which may include airfoils or the like which develop negative air pressure during rotation of the spray bar. It should also be noted that devices such as centrifugal blowers may be positioned close to the blast head to provide positive pressure through the tube 22 for forcing the water and debris through the tube. Water and debris from tube 22 is directed into a separation assembly 11 including a separator, which is preferably a one or two stage cyclonic separator 24, which allows the water and debris to fall out of the vacuum air flow into the bottom portion 26 of the separator 24. An air filter 43 may be provided to prevent small particles from entering the vacuum pump 20. Rotary valve 36 of the debris pump 28 then draws or allows the water and debris mix to pass, via gravity, through debris port 30 into a transfer cavity 29 of the debris pump 28. The rotary valve 36 rotates at a predetermined speed to seal along the barrel 31 of the debris pump to prevent vacuum from being applied to the debris tank 42 while transferring the water and debris from the cyclonic separator 24 to the debris tank 42. This cycle continues until the water and debris mix is transferred into the open or non-vacuum debris tank 42. The debris pump 28 preferably includes at least rotary valve 36 which allows vacuum to be maintained within the cyclonic separator while preventing the vacuum from being applied to the debris tank 42. The rotary valve is preferably secured to a fluid or electrically driven motor which includes a variable speed controller to control the rotational speed of the rotary valve to regulate the speed and volume of fluid and debris transferred to the debris tank 42. The debris tank 42 is preferably an open top tank that may be constructed from any material suitable in the art for constructing tanks. The system may be mounted on a vehicle, skid, trailer or any other suitable means for supporting the system. The debris tank 42 may also include a filter bag 41 or the like suitably secured within the debris tank 42 to allow the solid debris to be dewatered through a valve 45. The debris tank 42 may also include tilting or other dumping mechanisms 60 (FIG. 12) which allow the tank to be easily emptied without departing from the scope of the invention.

Referring to FIGS. 1-9, various views of a preferred embodiment of the cyclonic separator 24 and debris pump 28 are illustrated. The cyclonic separator 24 includes an inlet 44 for the traversal of air, water and debris into the cyclonic separator, a vacuum port 46 for application of vacuum and a debris port 30 for transfer of fluid and debris out of the cyclonic separator. In the preferred embodiment, the inlet 44 is fluidly connected to the shroud 19 of the blast head 12 via tube 22. Tube 22 is sized to allow for the transfer of fluid and debris from the blast head 12 without significant restriction. Vacuum port 46 is preferably positioned at the top portion of the cyclonic separator 24, and is sized to allow transfer of a suitable volume of air to allow the fluid and debris to be drawn through tube 22. Positioned within the cyclonic separator is a filter 43. The filter is removable and replaceable to allow cleaning and replacement thereof. In a preferred embodiment, the filter is a paper element that may include pre-filter covers and the like to prevent small particles from entering the vacuum pump 20. Cloth, gauze, foam or the like may be utilized in place of the paper element without departing from the scope of the invention. The bottom portion 26 of the separator 24 is suitably sized to retain a portion of the fluid and debris until the rotary valve can transfer the fluid and debris to the debris tank 42. Positioned at the bottom portion of the separator 24 is a debris port 30 suitably connected to the debris pump 28. The debris pump 28 generally includes a barrel 31, rotary valve 36 and motor 50. The barrel 31 may be any size and length suitable to transfer the volume of fluid and debris being removed and collected to a debris tank 42. In the preferred embodiment, the debris pump 28 is secured directly to the top of the debris tank 42 to allow fluid and debris transferred by the debris pump 28 to be transferred directly into the debris tank 42. The rotary valve 36 of the preferred embodiments sized to fit into the barrel and create a substantial seal between the edges of the rotary valve and the diameter and end plates of the barrel to maintain vacuum in the cyclonic separator. In one embodiment, the rotary valve 36 includes three chambers 29 separated by three vanes 52. The vanes preferably include polymeric wipers 54 which engage the inner diameter and ends of the barrel to maintain a substantial seal therebetween. Metal or polymeric plates 56 retain and position the polymeric wipers to allow for repair and replacement as needed due to abrasion or damage. The vanes are positioned so that debris may enter the top positioned one or two chambers while the remaining chamber(s) is/are releasing the debris and fluid into the debris tank through the discharge port 58. The wipers and retaining plates therefore are preferably constructed from a material that resists adhesion to sticky polymers and the like which may be found on the surfaces being cleaned. It should also be noted that while the rotary valve is depicted with three vanes, any number of vanes may be utilized which allow for the retention of vacuum in the cyclonic separator. The motor 50 is preferably a fluid drive motor having suitable size to rotate the rotary valve 36 while loaded with debris and fluid. In at least on embodiment, the motor is a hydraulic motor that includes a flow control or the like to allow control of the speed of rotation of the rotary valve. In this manner, the operator can cause the rotary valve to operate at a sufficient speed to keep debris from over accumulating in the bottom portion of the cyclonic separator. It should also be noted that while a hydraulic motor is illustrated, an air or electric motor along with suitable speed controls may be substituted without departing from the scope of the invention.

Figure 11:
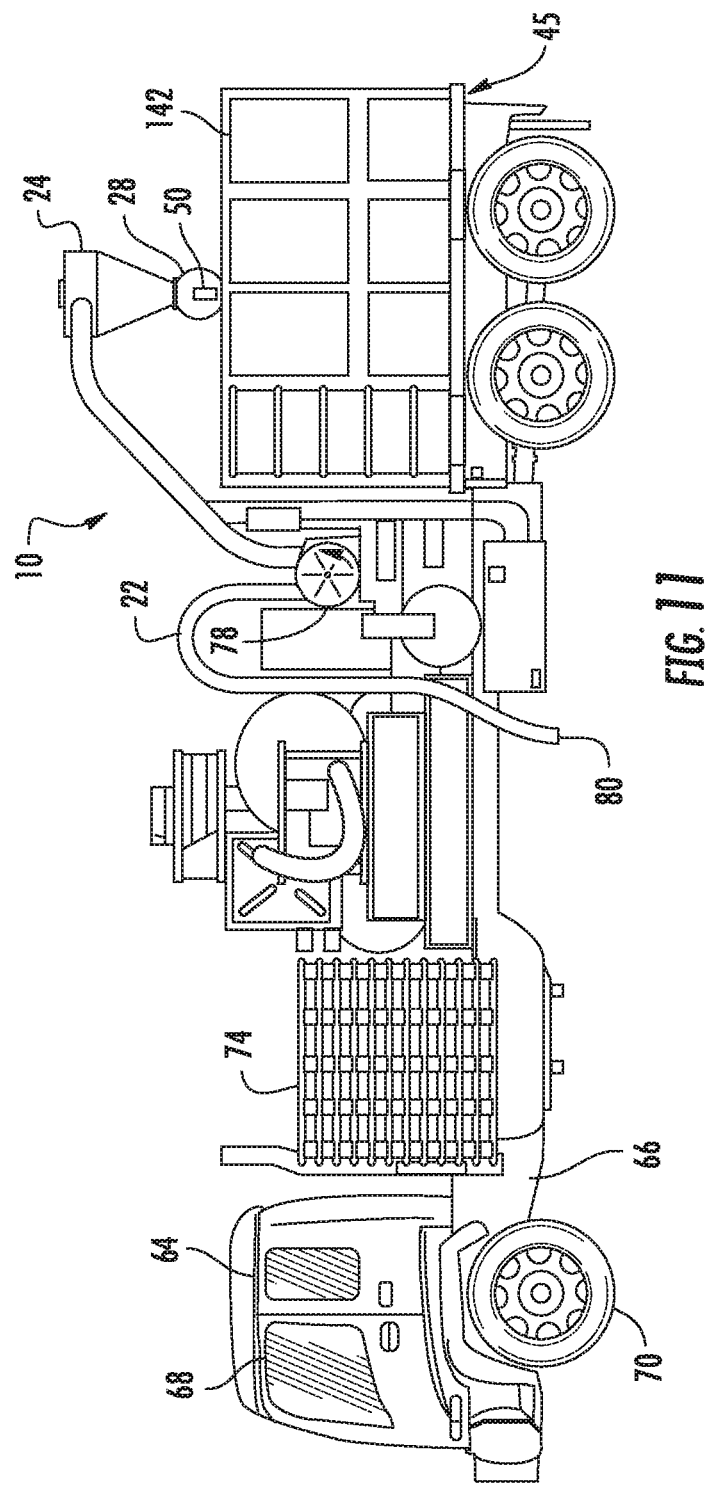
FIG. 11 is a side view of one embodiment of the present invention illustrated in use on vacuum tank truck.

Referring to FIGS. 10-14, various embodiments of the water and debris recovery system 10 are illustrated in combination with a mark removal truck 62 (FIG. 10) and vacuum truck 64 (FIG. 11), The trucks generally include an elongated chassis 66 for mounting the debris and recovery system and a cabin area 68 for an operator of the truck. Wheels 70, a driveline and a prime mover are secured to the chassis for portability of the system. In one embodiment, a crane 72 is secured to the separator 24 which allows the separator to be moved for transport of the vehicle or dumping of the debris tank 42. A ramp 74 may be secured to the elongated frame to allow a tractor or the like having a blast head secured thereto to be loaded onto the frame between the cabin and the debris tank 42 in a transverse direction with respect to the longitudinal axis of the elongated frame 66. The debris tank assembly 42 or combination debris and water tank 142 is secured to rear portion of the elongated frame for convenience of loading fresh clean water and offloading the dirty water and dewatered debris from the truck. FIG. 11 also illustrates an alternative embodiment wherein the vacuum pump 20 is replaced with a centrifugal blower assembly 78. The centrifugal blower should be mounted closer to the point of suction 80, illustrated herein as the open end of tube 22, due to the lower amount of vacuum but higher positive pressure delivered by the centrifugal fan 78. This embodiment is useful for situations where a vacuum tank truck would normally be utilized such as a municipality cleaning leaves from the roadside etc.

Figure 12:
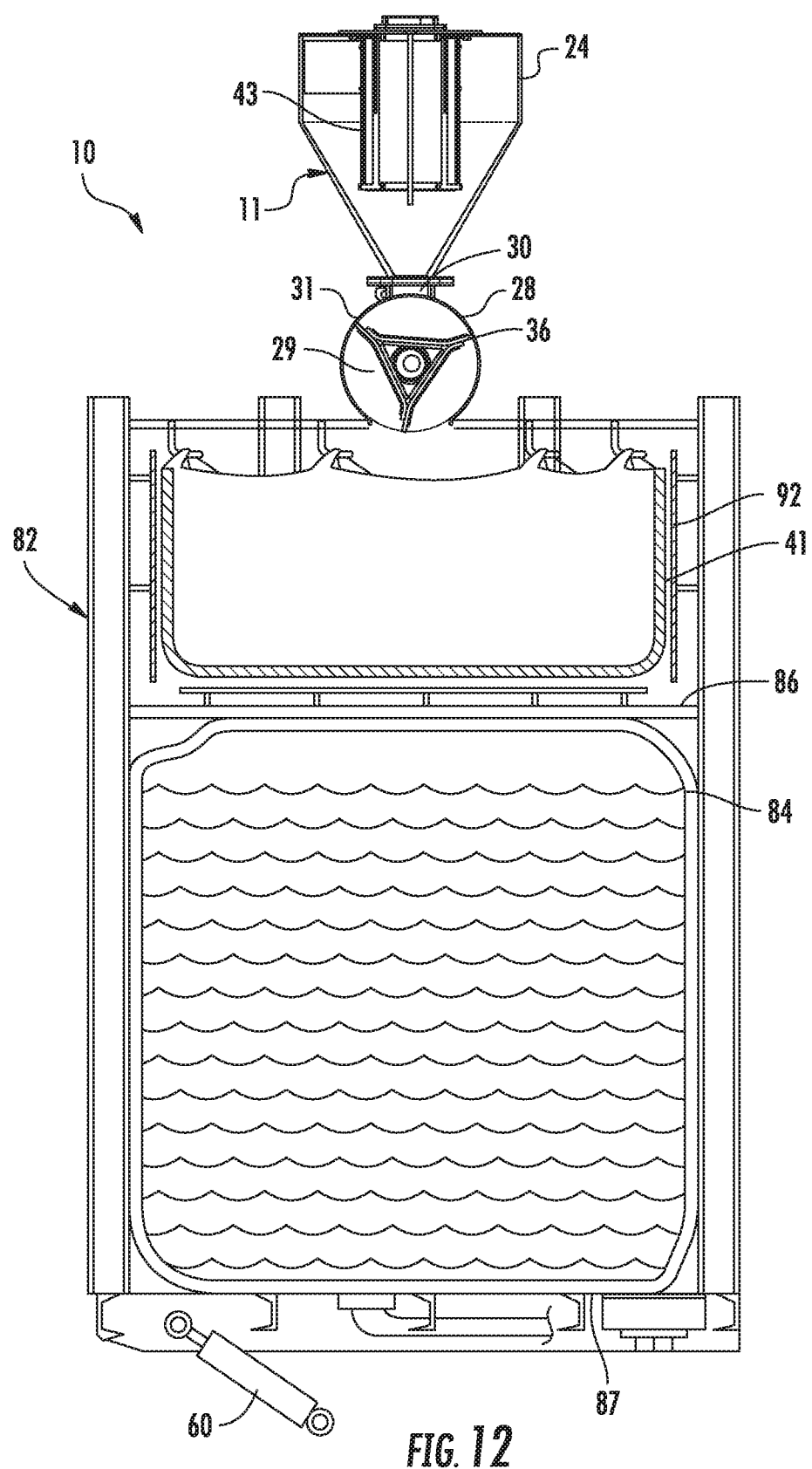
FIG. 12 is a section view of the preferred embodiment of the debris tank, illustrated full of clean water.
Figure 13:
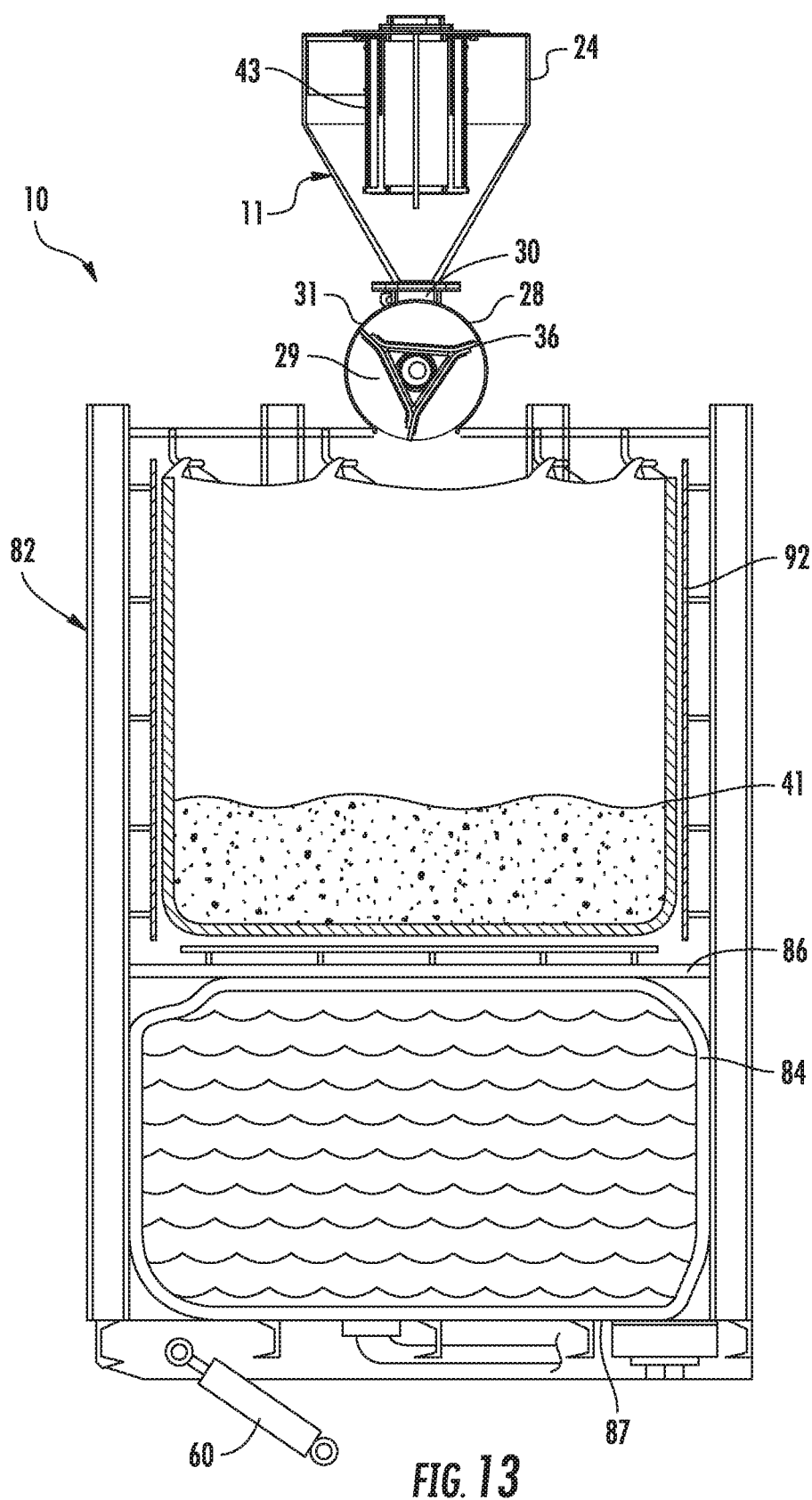
FIG. 13 is a section view of the embodiment illustrated in FIG. 12, illustrated with clean water dirty water and dewatered debris.
Figure 14:
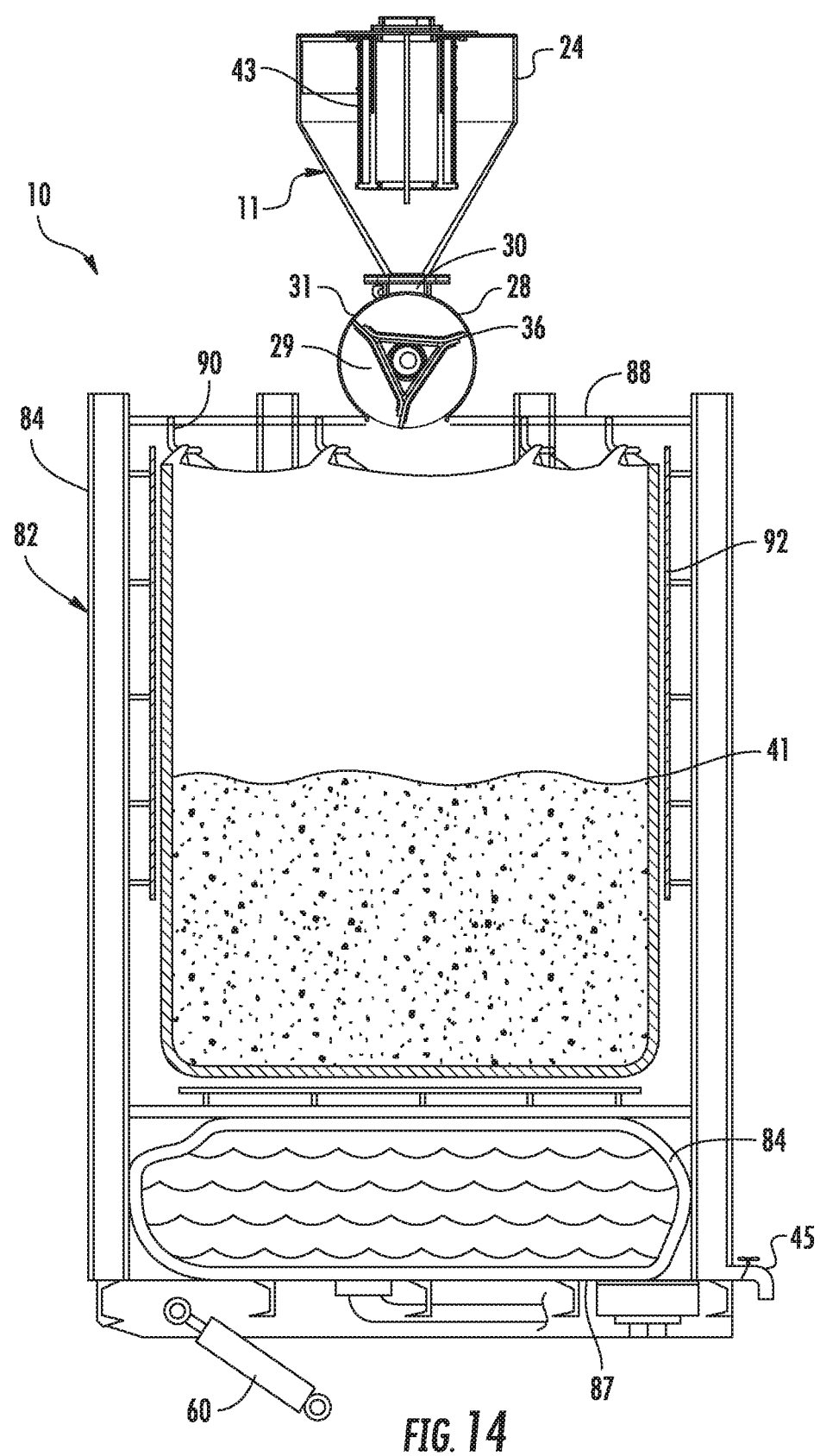
FIG. 14 is a section view of the embodiment illustrated in FIG. 12, illustrated with clean water dirty water and dewatered debris.

Referring to FIGS. 12-14, one embodiment of the debris tank assembly 142 is illustrated. In this embodiment, clean fresh water is stored in the same tank as the dirty reclaimed water from the blasting head albeit they are maintained separately. The combination debris tank assembly includes the tank 82, bladder 84, floating floor 86, filter bag 41, separator assembly 11 and tilt assembly 60. The tank 82 generally includes four side panels 84, a bottom panel 87 and a top panel 88 secured together to be substantially watertight. One panel is constructed and arranged to pivot away from the other panels to allow the water and debris inside to be dumped. The pivoting panel may only be a portion of one of the panels so long as the aperture created is large enough to dump the dewatered waste. The top panel of the tank 82 includes hooks 90 sized to hold a filter bag 41 in an open position inside the tank. In this manner the recovered water and debris is directed into the filter bag whereby the solids are trapped in the bag while the dirty water is free to fall farther into the tank. In at least some embodiments an expanded metal inner cage 92 may be supported in a spaced arrangement from the side panels to allow the filter bag to press against the perforations allowing the dirty liquid to separate from the solids in a more efficient manner. The bottom panel 87 includes a valve 45 sized to allow the dirty water to be drained from the tank 82. The bottom panel also includes the tilt assembly 60, illustrated herein as a hydraulic cylinder. The hydraulic cylinder is used as is known in the art for tilting a truck bed for dumping. Other means of tilting the tank may be utilized without departing from the scope of the invention. A bladder 84 is provided in the bottom portion of the tank for containing clean water. The bladder 84 is constructed from polymeric material such as rubber and may contain internal strengthening cords or supports which allow the bladder to be filled with water. Resting on the upper portion of the bladder 84 is a floating floor 86. The floating floor moves up and down within the tank as the bladder is filled or drained respectively. Guides in the form of rails, tracks, bearings or the like are preferably utilized to maintain the floating floor substantially perpendicular with respect to the side walls. In this manner the tank, e.g. bladder can be filled with clean water for transport to the job site with the filter bag empty as is shown in FIG. 12. As the water from the bladder is used the floating floor moves down in the tank allowing the debris and dirty water to flow into the tank as shown in FIG. 13. FIG. 14 illustrates the bladder in a substantially empty condition whereby the floating floor and filter bag are in an expanded condition. The dirty water that is separated from the solid debris is thus free to flow around the empty bladder. This construction thereby allows the same space to utilized for both the clean and dirty water as well as containing the solid debris significantly reducing the weight of the truck and reducing the space necessary for the equipment on the elongated frame of the truck.

All patents and publications mentioned in this specification are indicative of the levels of those skilled in the art to Which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A water and debris recovery system comprising:
    a debris tank assembly, said debris tank assembly including a plurality of side walls and a bottom wall, said side walls and said bottom wall secured together in a watertight configuration,
    a cyclonic separator assembly including a vacuum port for application of vacuum to said cyclonic separator, a debris inlet for receiving a stream of liquid and solid debris in a stream of flowing air as a result of said vacuum, said separator dividing said stream of flowing air from said liquid and solid debris, said stream of flowing air vented to the atmosphere, said liquid and solid debris falling to a bottom portion of said cyclonic separator, a debris pump transferring said liquid and solid debris to said debris tank, said debris pump including a barrel, a rotary valve and a motor, said barrel including a pair of end plates secured thereto to seal end portions of said barrel, said rotary valve positioned within said barrel and sized to create a substantial seal between the edges of said rotary valve and an inner surface of said barrel and said end plates of said barrel to maintain said vacuum in said cyclonic separator without said vacuum being applied to said tank assembly, said rotary valve selectively rotated by said motor to mechanically transfer said liquid and solid debris to said debris tank.

2. The water and debris recovery system of claim 1 said debris tank assembly including a filter bag supported in an open position in an upper portion of said debris tank assembly, said liquid and solid debris are allowed to fall into said filter bag after passing through said rotary valve.

3. The water and debris recovery system of claim 2 wherein said rotary valve includes three chambers separated by three vanes, each said vane including a polymeric wiper extending around the perimeter thereof and engaging said inner surface and said end plates, said vanes positioned so that debris may enter the top positioned one or two chambers while the remaining chamber releases debris and fluid into said filter bag.

4. The water and debris recovery system of claim including a bladder in a bottom portion of said debris tank assembly, said bladder being watertight for containing a first liquid, said bladder including a bladder outlet for filling and draining said bladder in a controlled manner, a bottom portion of said filter bag resting on an upper surface of said bladder, whereby as said bladder is drained an inner space of said filter bag gets larger.

5. The water and debris recovery system of claim 4 including a floating floor supported on said upper surface of said bladder, said filter bag resting on an upper surface of said floating floor, said floating floor moving up and down within said debris tank assembly as said bladder is filled or drained.

6. The water and debris recovery system of claim 5 wherein said floating floor includes a guide for causing said floating floor to move up and down in said debris tank while maintaining said floating floor parallel perpendicular to said side walls.

7. The water and debris recovery system of claim 6 wherein said guide is a plurality of rails positioned along said side walls for guiding said floating floor.

8. The water and debris recovery system of claim 1 wherein said debris tank includes a top wall secured to said side walls to enclose said debris tank assembly.

9. The water and debris recovery system of claim 8 wherein at least one of said top wall and said side walls includes a plurality of hooks secured to an inner surface thereof, said hooks sized to hold said filter bag in an open position inside said tank.

10. The water and debris recovery system of claim 8 wherein at least a portion of one said side panel is constructed and arranged to pivot away from the other said side panels to allow said liquid and said debris inside to be removed.

11. The water and debris recovery system of claim 10 wherein said side panels include an expanded inner cage supported in a spaced arrangement from an inner surface of said side panels.

12. The water and debris recovery system of claim 10 wherein said debris tank includes a tilt assembly for tilting said debris tank to a sufficient angle for dumping said liquid and said solids.

13. The water and debris recovery system of claim 5 wherein said debris recovery system is secured to the elongated frame of a vehicle.

14. The water and debris recovery system of claim 13 wherein said vehicle includes an ultra-high pressure pump for receiving liquid from said bladder, said ultra-high pressure pump directing pressurized liquid through a blast head having at least one nozzle, a shroud surrounding said at least one nozzle, a vacuum pump secured to said shroud for collecting said liquid as well as the solid debris dislodged by said liquid being expelled from said at least one nozzle, said liquid and said debris routed to said debris recovery system for collection.

* * * * *